United States Patent

Miller et al.

[15] 3,665,409

[45] May 23, 1972

[54] SIGNAL TRANSLATOR

[72] Inventors: Howard S. Miller; William Shooman, both of Nashua, N.H.

[73] Assignee: Sanders Associates, Inc., Nashua, N.H.

[22] Filed: June 18, 1970

[21] Appl. No.: 47,404

[52] U.S. Cl. ..........340/172.5

[51] Int. Cl. ..........G06f 7/38

[58] Field of Search ..........340/172.5

[56] References Cited

UNITED STATES PATENTS

| | | | |
|---|---|---|---|
| 3,374,468 | 3/1968 | Muir | 340/172.5 |
| 3,277,449 | 10/1966 | Shooman | 340/172.5 |
| 3,436,737 | 4/1969 | Iverson et al. | 340/172.5 |
| 3,374,463 | 3/1968 | Muir | 340/172.5 |
| 3,350,692 | 10/1967 | Cagle et al. | 340/172.5 |
| 3,210,737 | 10/1965 | Perry et al. | 340/172.5 |
| 3,371,320 | 2/1968 | Lachenmayer | 340/172.5 |
| 3,274,556 | 9/1966 | Paul et al. | 340/172.5 |
| 3,535,694 | 10/1970 | Anacker et al. | 340/172.5 |

*Primary Examiner*—Paul J. Henon
*Assistant Examiner*—Sydney R. Chirlin
*Attorney*—Louis Etlinger

[57] ABSTRACT

Signal translator for skew transfer or shifting of data from original data positions to remote positions. A number N of data bits is skew transferred or shifted in data position increments which are powers of the system radix, herein illustrated as two. A skew transfer network includes a routing net at each data position. The routing net at a particular data position receives data bits from data positions which are powers of two increments away therefrom. A control means responds to a skew distance code to provide timing signals to the routing nets so as to select the data bits corresponding to the specified shifting or skewing increment.

7 Claims, 5 Drawing Figures

INVENTORS
HOWARD S. MILLER
WILLIAM SHOOMAN
BY Robert R. Hubbard
ATTORNEY

*INVENTORS*
HOWARD S. MILLER
WILLIAM SHOOMAN

BY Robert R. Hubbard

*ATTORNEY*

INVENTORS
HOWARD S. MILLER
WILLIAM SHOOMAN

BY Robert R. Hubbard

ATTORNEY

SIGNAL TRANSLATOR

BACKGROUND OF INVENTION

This invention relates to novel and improved data processing apparatus and in particular to signal translating apparatus which is operable to translate signals from plural source points to plural destination points in various permutations.

Although the signal translating apparatus of the present invention is useful in any application which requires the transfer of signals from a plurality of source points to a plurality of destination points, it is especially useful in parallel processors where it is desired to relate different data with one another. For example, one parallel type computer design is described in the Proceeding of the IRE, Oct. 1958, and is entitled "A Computer Oriented Toward Spatial Problems," by S. H. Unger. The computer described in that article has an array of identical processing units and a means for transferring data in each unit to a small number of other processing units, often referred to as the "nearest neighbors" in a coordinate array. That is, each processing unit can communicate directly with its nearest horizontal and vertical neighbors.

One of the difficulties associated with the "nearest neighbors" technique is that the number of possible data transfer paths per instruction execution time is limited such that each task or problem must be structured or organized accordingly. For example, operands must be stored in such a way that a user's algorithm keeps most of the processing units active most of the time without frequent resort to multiinstruction sequences to transfer data between remotely located processing units.

BRIEF SUMMARY OF INVENTION

An object of the present invention is to provide novel and improved signal translating apparatus.

Another object is to provide novel and improved parallel processing apparatus having a plurality of processing units which can be interconnected in any desired permutation in a time which is relatively short as compared to a memory cycle.

In brief, the signal translator of the present invention is embodied in apparatus having circuit means which includes N data positions. The circuit means also includes means for providing N data signals at the N data positions. A clock signal means is operable to produce clock signals. Further included is a data transfer means which is coupled to the circuit means and to the clock signal means. The data transfer means is operable to transfer the data signals any number of the N data positions in $R^x$ increments, each incremental transfer occurring during a single clock cycle, where R is the radix and x has integer values.

In the preferred embodiment the system radix R is equal to 2. The data transfer means includes N networks the outputs of which are associated with different ones of the data positions. Each network then has X inputs which are adapted to receive the data signals from those data positions which are different powers of 2 increments away from the associated data position. The data transfer means further includes a control means which responds to the clock signal means and to a skew distance code to provide a control signal to said networks so as to enable the passing of one only of the data signals applied to each of the networks.

BRIEF DESCRIPTION OF THE DRAWINGS

In the accompanying drawings, like reference characters denote like elements of structure.

DESCRIPTION OF PREFERRED EMBODIMENT

Data transfer apparatus embodying the present invention is contemplated for use in any system of any radix where it is desired to translate signals from a plurality of source leads to a plurality of destination leads in various permutations. However, by way of example and completeness of description, the invention is described herein as embodied in a parallel type data processor which employs a radix of two.

Parallel processors are generally characterized by their ability to perform a large number of operations at a time by means of simultaneous operation of a large number of processing units. Data transfer apparatus embodying the present invention is useful to provide data routing paths between the various processing units of such parallel processors. Although the data may be operated upon (and/or transferred) in either word-parallel-bit-serial or in word-parallel-bit-parallel fashion, the invention is described herein for a parallel processor which operates in a word-parallel-bit-serial mode.

Before proceeding any further, it is well to briefly discuss terminology. A bit is an item of information which has a value of "1" or "0" and is represented in a computer by bi-level electrical signals. When such a signal is at one level, it represents the binary value "1" and when it is at the other level, it represents the binary value "0." For the sake of the discussion which follows, it may be assumed that the high and low level signals represent the binary values "1" and "0," respectively. A data word consists of a number L of bits and a memory block consists of a number $K$ of memory locations or addresses, each of which may store a data word.

In a word-parallel-bit-serial computer such as the one described in U.S. Pat. No. 3,277,449 issued to William Shooman, a number $K$ of one bit arithmetic and logic networks (ALN) operate simultaneously on bits of the same significance in $K$ data words. Although $K$ may have any suitable value, it is preferably equal to the system radix two raised to some power $n(K=2^n)$. For the purpose of the present description the value of $n$ is arbitrarily chosen as 10 such that $K$=1,024. That is, the computer contains 1,024 ALN's and 1,024 memory locations per memory block. Also for convenience, the number of bits per data word is arbitrarily chosen as 32 and the number of memory blocks is also chosen as 32. It will be appreciated that the above chosen values represent merely one system design and that other values can be chosen for other designs.

Figure 1:
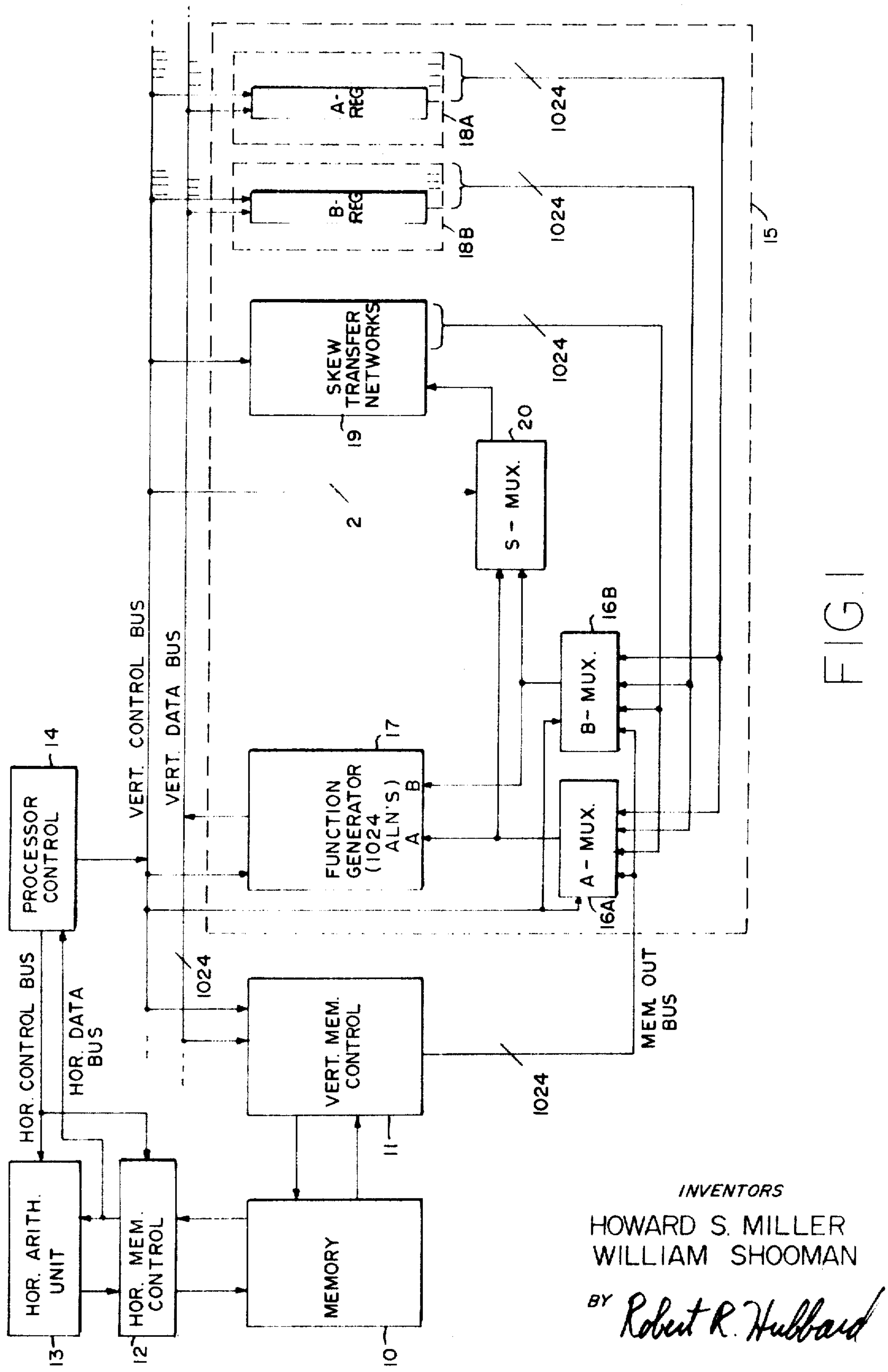
FIG. 1 is a block diagram of data processing apparatus embodying the signal translator of the present invention.

With reference now to the parallel computer block diagram of FIG. 1, the memory 10 includes 32 blocks of 1,024 data word locations with 32 bit positions per data word location. For addressing in the word-parallel-bit-serial mode, a vertical memory control 11 is provided to address or select one of the memory blocks and one bit position within that block. Thus, vertical memory control 11 can simultaneously read or write 1,024 bits from or into a selected vertical bit position which is common to all 1,024 data words of a selected memory block, the selected vertical bit position being of the same relative significance in each such data word. For convenience, the addressable vertical bit positions will be referred to as columns of bits or data in the description which follows. Thus, vertical memory control 11 includes the necessary addressing circuitry, readwrite drivers, sense amplifiers, and so on to address a column of data in a memory cycle.

Columns of data read from memory 10 are routed via a memory output bus to a pair of multiplexing networks A–MUX and B–MUX **16*a* and 16*b*, respectively, shown in FIG. 1 as a part of an arithmetic and logic section 15. The arithmetic and logic section 15** also includes a function generator 17, a group of A registers 18A and a group of B registers 18B. For convenience only one each of the A and B registers are shown in FIG. 1. Like memory 10 the A and B multiplexers, the function generator and the A and B registers each contain 1,024 data positions, one for each bit in a data column. Thus, the function generator 17 contains 1,024 arithmetic and logic networks (ALN), the A and B registers contain 1,024 bit storage devices (e.g., flip-flops) and the A and B multiplexers each contain 1,024 switching networks.

Each ALN of the function generator 17 contains the necessary circuitry to perform various logical and arithmetic operations on two inputs, designated in FIG. 1 as A and B. These operations are programmable in accordance with a code received from a processor control section 14 via a vertical control bus VCB. Typical operations may include binary addition, subtraction and any of the 16 Boolean functions. The function generator is also capable of routing either its A or B input directly to a vertical data bus VDB from which the data may be routed either to a selected one of the A and B registers or to a selected vertical or column address in memory 10.

The A and B multiplexers are operable to couple the A and B inputs of the function generator ALN's to columns of data from several different sources. Thus, data originating in either memory 10, a selected A register, a selected B register or from the output of a skew transfer section 19 (to be discussed later) may be coupled to either the A or B inputs of the function generator 17 as directed by the processor control 14. Thus the A–MUX and the B–MUX are both shown in FIG. 1 to have control lead connections to the VCB.

The processor control section 14 includes all the necessary timing and control circuits to direct the flow of data between the memory 10 and the arithmetic and logic section 15 as well as the operations performed on data by the arithmetic and logic section. To this end, processor control 14 includes the necessary program addressing and decoding circuitry to provide the appropriate execution control signals to perform various data transfers and operations on the data. By way of example of one system design, processor control 14 is also shown to control a word-serial-bit-parallel computer of which a horizontal memory control 12 and a horizontal arithmetic section 15 are shown in FIG. 1. The horizontal memory control 12 is operable to access data words and arithmetic section 15 is structured to operate upon such data words in the conventional manner. For this particular system design, the horizontal memory control 12 and horizontal arithmetic unit 13 may be employed by processor control 14 for the accessing and processing of program instructions stored in memory 10. Thus, the program for vertical processing may be stored in memory 10 as data words, with one or more data words constituting an instruction. This, of course, represents a design choice and for some designs it may be appropriate to store instructions as columns of data, in which case vertical memory control 11 would be employed by the processor control 14 to access the instructions.

An example of an orthogonal instruction is orthogonal Add, where 1,024 sums are formed in parallel, one bit at a time. When the skew transfer apparatus of this invention is not employed, each of the 1,024 pairs that are added must be at the same relative bit levels.

For many operations, however, it might be desirable to relate data bits of different levels or data positions to one another. For example, where it is desired to sum a block of data, the different bits in a column of data must be added together. In accordance with apparatus embodying the present invention the number $N$ (in the present example $N$=1,024 of data signals can be shifted or transferred to $2^x$ data positions or locations away from the original positions in a single clock cycle, where $2^x$=$N$. Thus for $N$=1,024, a minimum data shift of one position and a maximum data shift of 512 positions is possible in any one clock cycle. To obtain a data shift or transfer a number of locations which is not a power of 2 away from the original locations, the transfer is accomplished in powers of 2 increments during different clock cycles, where the sum of the increments is equal to the desired amount of shift. Thus to shift 19 positions, three clock cycles are required to produce incremental shifts of $2^4$ (16), $2^1$ (2) and $2^0$ (1), the sum of which is equal to 19.

With reference again to FIG. 1 a column of data to be shifted or skewed is routed from the outputs of either the A–MUX or B–MUX via a skew multiplexer (S–MUX) 20 to the skew transfer networks 19. Like the function generator 17, the skew transfer networks 19 and the S–MUX 20 include $N$=1,024 data positions.

The S–MUX 20 receives a code from the processor control 14 which will select either the A data or the B data for skewing by the networks 19. The processor control 14 also applies a timing code to all of the 1,024 skew logic networks so as to affect a desired incremental $2^x$ shift of data positions. The shifted or skewed bits are then rerouted through the A or the B multiplexers, as the case may be, to the function generator 17 where an operation may be performed in accordance with the code supplied thereto by the processor control 14. For the example of a simple shift, the function generator 17 merely passes the shifted or skewed bits to the vertical data bus from which they are reinserted into the previously selected A or B register.

Figure 2:
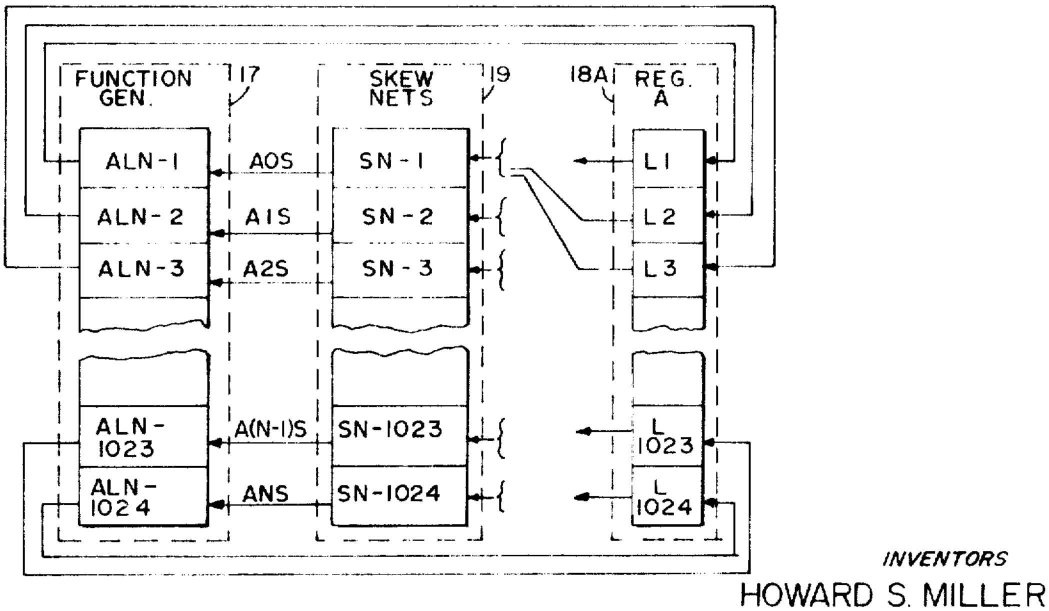
FIG. 2 is a more detailed diagram of a portion of the FIG. 1 block diagram showing a typical data flow path for the signal translator of the present invention.

Referring now to FIG. 2 there is shown a typical data flow path for a skew transfer operation. As shown in FIG. 2 data bits from a selected A register 18A are skewed by skew networks 19. The skewed data is then passed by the function generator 17 and reapplied to the A register. The 1,024 data positions or bit levels are considered to be numbered consecutively from 1 to 1,024. In FIG. 2 then the skew networks 19 are shown to have individual skew networks SN–1 to SN–1,024 associated with the correspondingly numbered bit positions. Each of the skew networks has a single output coupled to a correspondingly numbered ALN and receives $X$=10 inputs from those data positions of the A register which are powers of 2 increments removed therefrom.

Figure 3:
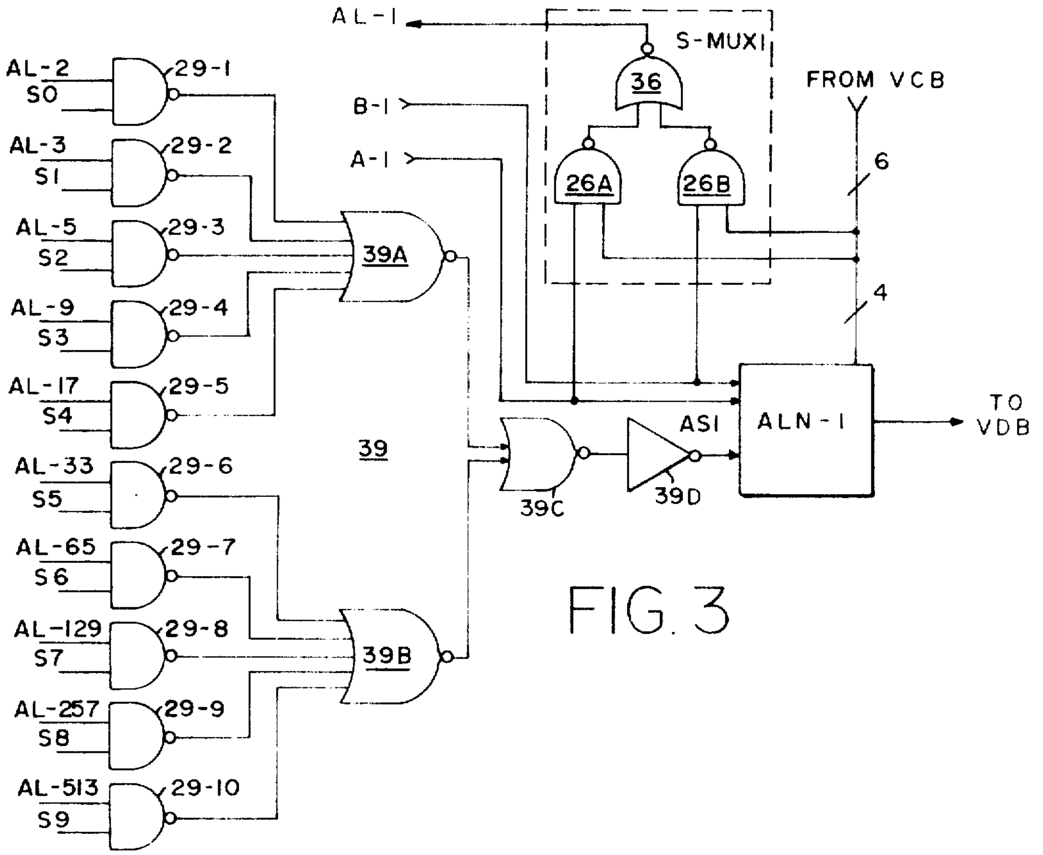
FIG. 3 is a schematic diagram illustrative of the logic circuitry for a single data position of the skew transfer networks and skew multiplexer.

As an example of the aforementioned connectivities for the individual skew networks, the skew network SN–1 is shown in more detail in FIG. 3. As shown in FIG. 3, the SN–1 skew network includes a first level of 10 coincidence type gates 29–1 29–10. By way of example, the coincidence type gates in FIG. 3 are shown as NAND gates although it is understood that any other suitable coincidence type gate may be employed. Each of the NAND gates 29–1 through 29–10 has two inputs, the first of which is one of the data bits from a power of two data positions away, and the other of which is a coded timing signal which is supplied by the processor control 14 (FIG. 1). Thus, the NAND gates 29–1 through 29–10 receive as one input the bits from register positions L–2, L–3, L–5, L–9, L–17, L–33, L–65, L–129, L–257 and L–513, respectively, and receive as the other input the coded timing signals S0 through S9, respectively. As will be discussed in detail later, only a single one of the coded timing pulses S0–S9 can be present or high during a specific clock cycle. Thus, only that data bit which is applied to the same NAND gate which receives a high going one of the timing pulses will be passed.

The outputs of all the NAND gates 29–1 through 29–10 are combined in an OR network 39 to produce the skewed data bit AS1 which is applied to the correspondingly numbered data position of the function generator ALN–1. As shown in FIG. 3, OR net 39 has been shown, by way of example only, as comprising a first NOR gate 39A for the outputs of the NAND gates 29–1 through 29–5 and a second NOR gate 39B for the NAND gates 29–6 through 29–10. The outputs of the NOR gates 39A and 39B are applied to a third NOR gate 39C the output of which is then inverted by an inverter 39D to provide the AS1 skewed data bit.

Also shown in FIG. 3 is the S multiplexer for the first data position S–MUX 1. As shown in FIG. 3, S–MUX 1 includes a pair of NAND gates 26A and 26B receiving as inputs the data bits A–1 and B–1, respectively, associated with the first data position or bit level. The gates 26A and 26B also receive as inputs different control signals from the vertical control bus VCB. These control signals select which of the A or B data bits are to be applied to the skew networks. The outputs of the NAND gates 26A and 26B are combined by means of a NOR gate 36 to provide the AL–1 data bit to the skew transfer networks 19.

It will be appreciated that the foregoing connections and gating networks represent an exemplary embodiment for a radix of two and an end around shift. For the more general case the radix R should be substituted for the number 2 and different bits in a column may be skewed by different increments during the same clock cycle according to the connection pattern chosen. In addition, it is understood that the invention is applicable to any uniform distribution of bits, such as a non-end around shift.

Figure 4A:
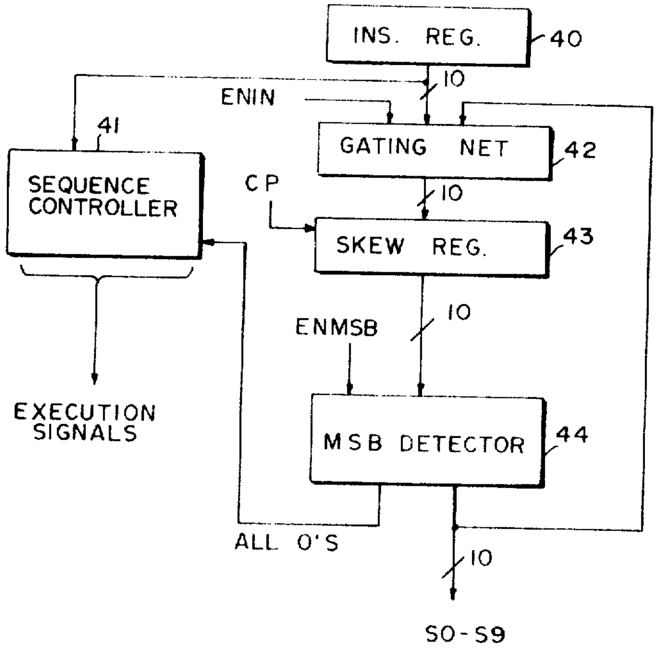
FIG. 4A is a block diagram of a portion of the control section which controls the skewing of data by the skew transfer network.

Referring now to FIG. 4A there is shown a portion of the processor control 14 including an instruction register 40 which holds the current instruction. Not shown is the instruction addressing and fetching apparatus which may be conventional. A portion of the OP code is employed for specifying a skew transfer.

The OP code is applied to a sequence controller 41 which interprets the OP code and produces a number of execution signals which are employed to execute the function called for by the OP code. For the sake of convenience, it is assumed that the clock for the computer is contained within the sequence controller 41. If the OP code contains a skew code, the sequence controller 41 will provide an execution signal (enable in) designated in FIG. 4A as ENIN which enables a gating net 42 to pass the skew code to a skew register 43. For the sake of convenience, the skew code has been illustrated in FIG. 4A as comprising a 10-bit code though it is understood that a lesser or greater number of bits may be employed in the code together with a decoder, if desired. The output of the skew register 43 is applied in parallel to a most significant bits (MSB) detector 44. The MSB detector 44 is operable to detect the most significant "1" of the contents of the skew register 43 and to provide an output on a corresponding one of 10 output leads designed so S0 through S9 corresponding to the S0 through S9 coded timing pulses as shown in FIG. 3.

Figure 4B:
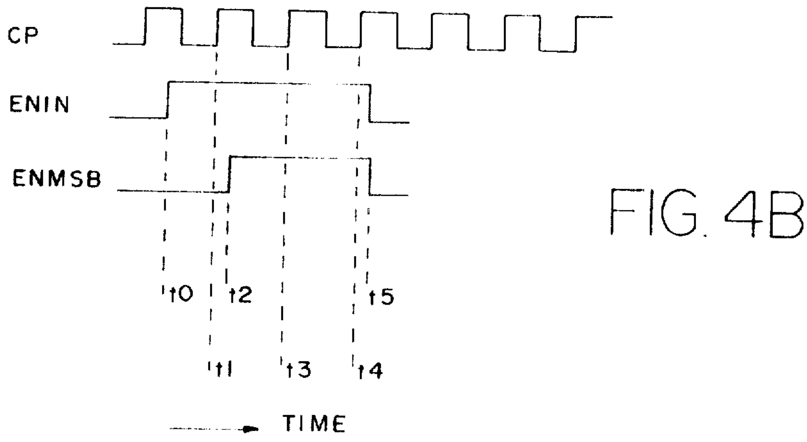
FIG. 4B is a wave form diagram which is illustrative of the operation of the processor control shown in FIG. 4A.

The skew register 43, for the purpose of this example, is assumed to contain clocked type flip-flops, such as JK flip-flops which respond to one of the clock pulse edges, say the rising edge. Thus, the skew register 43 in initially loaded in response to the first rising clock pulse edge which occurs after the execution signal ENIN occurs. The ENIN execution signal is shown in the waveform diagram of FIG. 4B to commence at a time *t0*. The next rising edge of the clock CP occurs at a time *t1* such that the skew register 43 is loaded at this time. The MSB detector 44 may now be enabled by an execution signal designated as ENMSB shown in FIG. 4B as occurring at a time *t2*. Thus, at time *t2* that one of the signal leads S0–S9 corresponding to the most significant "1" of the contents of the skew register 43 will be active (e.g., driven high to enable one NAND gate in each of the skew nets 19 of FIG. 1).

The S0–S9 leads are further coupled as inputs of gating net 42 where the detected most significant "1" inhibits the corresponding "1" of the skew code. For example, assume that the left hand bit of the skew code is the most significant bit and corresponds to the timing lead S0. Now further assume the most significant bit is a "0" and that the second bit from the left is a "1." Thus, only the lead S1 lead will be high at time *t2* and all of the other leads will be low. The one-bit on the S1 lead will inhibit the second bit position of gating net 42 so that the corresponding flip-flop in the skew register 43 will now be enabled to switch to its "0" state, in response to the next succeeding rising edge of the clock signal, which rising edge occurs at time *t3*. From time *t2* to *t3* the S1 signal enables its corresponding NAND gates in the skew nets 19 (FIG. 1) to skew transfer the data a single power of 2 increment. The skewed data are then passed to the function generator 19 and returned to a selected register (FIG. 2). It is assumed that the total signal propagation delay through the skew nets, the function generator, the A–MUX, the B–MUX, and S–MUX is less than the period of the clock CP.

At time *t3*, the skew register 43 is again clocked by the clock pulse CP. In accordance with the foregoing example, that flip-flop of the skew register holding the second most significant bit is switched from its "1" state to its "0" state at time *t3*. The MSB detector 44 responds to the new contents of the skew register 43 to drive the S1 lead low and to detect the next most significant "1" of the skew register contents. For instance, if the next most significant "1" is the eighth bit from the left, the S7 lead will at this time be driven high. The S7 signal will enable its corresponding NAND gates in the skew nets 19 to skew transfer the data another single power of 2 increment. The S7 signal also inhibits the binary "1" in the eighth bit position of the skew code such that at time *t4* that flip-flop of the skew register which holds the eighth most significant bit will be switched from the "1" state to the "0" state. By time *t4* the second incremental power of 2 skew transfer has occurred and the resulting skewed data has again been placed in the selected register. If there are binary "1"s in the ninth and 10th positions of the skew code, the FIG. 4A apparatus continues to respond in the manner described above to provide additional incremental powers of 2 skew transfers.

Whenever the MSB detector 44 detects that all of the bit positions of the skew register 43 are "0"s, it provides an all "0"s signal to sequence controller 41. Sequence controller 41 responds to the all "0"s condition to terminate the ENIN and the ENMSB signal and to initiate other execution signals (not shown) which cause the function generator 17 (FIG. 1) to execute the function called for by the operation code.

The FIG. 4A control apparatus described above is, of course, an exemplary embodiment illustrating the technique of interpreting a skew distance code so as to provide control signals on the proper control leads during successive clock times to effect successive $2^x$ increments of data transfer. The sum of the $2^x$ increments is then equal to the total amount of shift called for by the OP CODE.

It will thus be seen that the objects as set forth above, among those made apparent from the preceding description, are efficiently attained and certain changes may be made in the illustrated structures without departing from apparatus which embodies the invention.

What is claimed is:

1. In vertical processing apparatus having a memory, an arithmetic and logic section and control circuit means for transferring selected vertical slices of data from said memory for processing by said arithmetic and logic section in accordance with a program, and clock signal means for producing clock signals for timing the operation of said memory, said arithmetic and logic section, each vertical data slice including up to N data digits and the control circuit means being operable to provide up to N data signals at N corresponding data positions for each data transfer; the improvement comprising:
   data skewing means included in the control circuit means for skew transferring said data signals a number of said data positions in increments of $R^x$ position, the sum of the increments being equal to said number, with each incremental data transfer occurring during a single clock cycle, where R is the radix and X has integer values.

2. The invention according to claim 1
   wherein said data skewing means performs successive $R^x$ position increments of data transfer in consecutive clock cycles.

3. The invention according to claim 2
   wherein said data skewing means includes N networks each of which includes:
   a. an output lead associated with a corresponding data position, and
   b. Y data input leads adapted to receive the data signals from those data positions which are different $R^x$ increments away from the associated data position;
   wherein said data skewing means further includes means for providing to each of said networks control signals each indicative of different $R^x$ position increments and during consecutive clock cycles; and wherein each said network responds to said control signals during consecutive clock cycles to couple its output lead to that one of its Y input leads which corresponds to a current $R^x$ valued control signal.

4. The invention according to claim 3
wherein said control signal providing means includes:
a. means for providing a code indicative of said number of data positions of transfer; and
b. means responsive to said code and to said clock signal means to provide the control signals.

5. The invention according to claim 4
wherein the radix R equals two;
wherein said means responsive to the code includes
a. a register for temporarily storing a binary number having Y orders, and indicative of said code, each order of which represents a different power of two transfer increment, said binary number being indicative of the total number of data positions to be skew transferred;
b. Y control leads corresponding in order to the orders of said binary number; said Y control leads being coupled to each of said networks;
c. means for detecting during successive clock cycles the most significant bit of one binary value in said register and for producing a control signal on the correspondingly ordered one of the Y leads to thereby effect an incremental power of two data transfer; and
d. means responsive to the detection of said most significant bit during each clock cycle to change its value to the other binary value such that the incremental powers of two data transfers called for by said binary number are performed during consecutive clock cycles.

6. A data shifting network in which data is shifted in increments of powers of two, said network comprising
circuit means having N data positions with each data position having a destination lead and a source lead, said circuit means further including means for producing N data signals on said N source leads;
a clock signal generator for producing clock signals;
N gating networks associated with corresponding ones of said data positions, each said network having Y gating paths coupled from the corresponding source lead to Y destination leads which are different powers of two data positions away;
a register for temporarily storing a binary number having Y orders, each of which represents a different power of two shift increment, said binary number being indicative of the total number of data positions to be shifted;
Y control leads corresponding in order to the orders of said binary number and being coupled to corresponding ones of the Y gating paths in said N-networks;
detection means including means for detecting during successive clock cycles the most significant bit of one binary value in said register and producing a control signal on the correspondingly ordered one of said Y leads, which control signal enables the corresponding power of two gating path in each of said networks, thereby effecting an incremental data shift of a power of two data positions in one clock cycle; and
means responsive to said detection of a most significant bit of one binary value during each clock cycle to change its value to the other binary value such that the incremental powers of two data shifts called for by said binary number are performed during consecutive clock cycles.

7. The invention as set forth in claim 6
wherein said detection means also includes means for detecting when the orders of said binary number are all of the other binary value; and
wherein means responsive to said detection of all the binary number orders being of the other value disables said detection means and said value changing means.

* * * * *